US012657718B2

(12) United States Patent
Ribeiro et al.

(10) Patent No.: US 12,657,718 B2
(45) Date of Patent: Jun. 16, 2026

(54) STANDARDIZING IMAGES OF ANATOMICAL STRUCTURES FOR ANALYSIS BY MACHINE LEARNING SYSTEMS

(71) Applicant: PEEK HEALTH S.A., Braga (PT)

(72) Inventors: João Pedro de Araújo Ribeiro, Braga (PT); Sara Isabel Azevedo Da Silva, Braga (PT); Jaime Frederico Bastos De Campos, Braga (PT)

(73) Assignee: PEEK HEALTH S.A., Braga (PT)

( * ) Notice: Subject to any disclaimer, the term of this patent is extended or adjusted under 35 U.S.C. 154(b) by 245 days.

(21) Appl. No.: 18/344,128

(22) Filed: Jun. 29, 2023

(65) Prior Publication Data

US 2024/0005504 A1 Jan. 4, 2024

(30) Foreign Application Priority Data

Jul. 1, 2022 (EP) ..................................... 22398014

(51) Int. Cl.
*G06T 15/00* (2011.01)
*G06T 7/00* (2017.01)
*G06T 7/33* (2017.01)

(52) U.S. Cl.
CPC ............ *G06T 7/0014* (2013.01); *G06T 7/337* (2017.01); *G06T 15/00* (2013.01);
(Continued)

(58) Field of Classification Search
CPC ....... G06T 7/0014; G06T 7/337; G06T 15/00; G06T 2200/04; G06T 2207/10116;
(Continued)

(56) References Cited

U.S. PATENT DOCUMENTS 9,861,446 B2 1/2018 Lang
11,278,413 B1 3/2022 Lang
(Continued)

FOREIGN PATENT DOCUMENTS

EP 3470006 4/2019
EP 4239581 3/2022
(Continued)

OTHER PUBLICATIONS

Zheng, J., Miao, S., Jane Wang, Z., & Liao, R. (2018). Pairwise domain adaptation module for CNN-based 2-D/3-D registration. Journal of Medical Imaging, 5(2), 021204-021204. (Year: 2018).*
(Continued)

*Primary Examiner* — Daniel F Hajnik
*Assistant Examiner* — Adeel Bash
(74) *Attorney, Agent, or Firm* — Fish & Richardson P.C.

(57) ABSTRACT

A computer-implemented method includes receiving a real two-dimensional medical image of a patient, processing the real two-dimensional medical image with a computer-implemented generator configured to transfer the real two-dimensional medical image from a real image domain into a synthetic image domain, and analyzing the two-dimensional medical image transferred into the synthetic image domain with a machine-learning model. The machine-learning model was trained with a collection of synthetic two-dimensional medical images generated from real three-dimensional medical images.

19 Claims, 4 Drawing Sheets

(52) U.S. Cl.

CPC . *G06T 2200/04* (2013.01); *G06T 2207/10116* (2013.01); *G06T 2207/20081* (2013.01); *G06T 2207/20084* (2013.01); *G06T 2207/30008* (2013.01)

(58) Field of Classification Search

CPC . G06T 2207/20081; G06T 2207/20084; G06T 2207/30008; G06T 2211/441; G06T 11/008

See application file for complete search history.

(56) References Cited

U.S. PATENT DOCUMENTS

| | | | |
|---|---|---|---|
| 11,660,197 | B1 | 5/2023 | Lang |
| 2005/0059873 | A1 | 3/2005 | Glozman et al. |
| 2014/0303938 | A1 | 10/2014 | Schoenefeld et al. |
| 2019/0286938 | A1* | 9/2019 | Backhus ............... G06F 18/214 |
| 2020/0005461 | A1 | 1/2020 | Yip |
| 2020/0311911 | A1 | 10/2020 | Poole |
| 2020/0334897 | A1 | 10/2020 | Oved |
| 2021/0093386 | A1 | 4/2021 | Poltaretskyi et al. |
| 2021/0192727 | A1 | 6/2021 | Ward et al. |
| 2021/0342638 | A1* | 11/2021 | Ghesu .................... G06N 20/00 |
| 2022/0036564 | A1 | 2/2022 | Ye et al. |
| 2022/0133484 | A1 | 5/2022 | Lang |
| 2023/0281842 | A1 | 9/2023 | Ribeiro et al. |

FOREIGN PATENT DOCUMENTS

| | | |
|---|---|---|
| WO | WO 2012112694 | 8/2012 |
| WO | WO 2016110816 | 7/2016 |
| WO | WO 2016116946 | 10/2016 |
| WO | WO 2019180745 | 9/2019 |
| WO | WO 2020198380 | 10/2020 |

OTHER PUBLICATIONS

Dhont, J., Verellen, D., Mollaert, I., Vanreusel, V., & Vandemeulebroucke, J. (2020). RealDRR-Rendering of realistic digitally reconstructed radiographs using locally trained image-to-image translation. Radiotherapy and Oncology, 153, 213-219. (Year: 2020).*

Sakib, S., Tazrin, T., Fouda, M. M., Fadlullah, Z. M., & Guizani, M. (2020). DL-CRC: deep learning-based chest radiograph classification for COVID-19 detection: a novel approach. Ieee Access, 8, 171575-171589. (Year: 2020).*

Mahapatra D, Elastic registration of medical images with gans, 2019. (Year: 2019).*

Bayoudh et al., "Hybrid-COVID: a novel hybrid 2D/3D Cnn based on cross-domain adaptation approach for COVID-19 screening from chest X-ray images, " Physical and engineering sciences in medicine, Dec. 10, 2020, 43(4):1415-31.

Bonnin et al., "Mediolateral oversizing influences pain, function, and flexion after TKA," Knee Surgery, Sports Traumatology, Arthroscopy, Oct. 2013, 21:2314-24.

Extended European Search Report in European Appln. No. 22398005. 3, mailed on Aug. 18, 2022, 12 pages.

Extended European Search Report in European Appln. No. 22398014. 5, mailed on Feb. 21, 2023, 8 pages.

Gromov et al., "What is the optimal alignment of the tibial and femoral components in knee arthroplasty? An overview of the literature," Acta Orthopaedica, Sep. 2014, 85(5):480-7.

International Preliminary Report on Patentability in International Appln. No. PCT/PT2022/050031, mailed on May 29, 2024, 12 pages.

International Search Report and Written Opinion in International Appln. No. PCT/PT2022/050031, mailed on Feb. 8, 2023, 14 pages.

Kasten et al., "End-To-End Convolutional Neural Network for 3D Reconstruction of Knee Bones from Bi-planar X-Ray Images," MLMIR, Springer, Oct. 21, 2020, pp. 123-133.

Kawahara et al., "A lateralized anterior flange improves femoral component bone coverage in current total knee prostheses," The Knee, Aug. 2016, 23(4):719-24.

Mahoney et al., "Overhang of the femoral component in total knee arthroplasty: risk factors and clinical consequences, " JBJS, May 1, 2010, 92(5):1115-21.

Sarvamangala et al., "Convolutional neural networks in medical image understanding: a survey," Evolutionary intelligence, Mar. 2022, 15(1):1-22.

Schroeder et al., "In vivo tibial fit and rotational analysis of a customized, patient-specific TKA versus off-the-shelf TKA, " The Journal of Knee Surgery, Jun. 2019, 32(06):499-505.

Wang et al., "DeepOrganNet: on-the-fly reconstruction and visualization of 3D/4D lung models from single-view projections by deep deformation network, " IEEE Transactions on Visualization and Computer Graphics, Jan. 1, 2020, 26(1):960-70.

Ying et al., "X2CT-GAN: reconstructing CT from biplanar X-rays with generative," InProceedings of the IEEE/CVF Conference on Computer Vision and Pattern Recognition, Jun. 1, 2019, pp. 10619-10628.

* cited by examiner

STANDARDIZING IMAGES OF ANATOMICAL STRUCTURES FOR ANALYSIS BY MACHINE LEARNING SYSTEMS

CROSS-REFERENCE TO RELATED APPLICATIONS

This application claims priority to European Patent Application No. 22398014.5, filed Jul. 1, 2022, the entirety of which is hereby incorporated by reference.

TECHNICAL FIELD

This application relates to standardizing images of bones and other anatomical structures for analysis by machine learning systems. The machine learning systems can be trained to, e.g., inform medical practitioners, diagnose medical conditions, plan surgical procedures, and design orthopedic and other implants.

BACKGROUND

Machine learning models are trained using training data. Although the models can be trained to perform a variety of different tasks, the ability of a machine learning model to perform a task is inherently grounded in the quality and nature of the data used to train the model.

SUMMARY

This application relates to standardizing images of bones and other anatomical structures for analysis by machine learning systems.

In more detail, real-world images of anatomical structures—including two-dimensional x-ray images of bones—are often highly variable. Images can be acquired using different imaging devices. The settings of even identical devices can vary. Even with a single imaging device during a single imaging session at the same settings, the images can vary. Background radiation level may fluctuate. The supplied power may not be steady. Perhaps most importantly, the relative orientation of the anatomy and the imaging device may change.

Although some well-trained human practitioners may be adept at dealing with such variability, machine learning systems that are trained using data with low variability may not. An example of training data with low variability is synthetic two-dimensional x-ray images that are digitally reconstructed from three-dimensional images, e.g., from NMR or CAT images. The devices that capture three-dimensional images are generally quite sophisticated and the resultant three-dimensional images have generally very high quality. This contrasts with the imaging devices that capture two-dimensional x-ray images in the real world. These imaging devices may be simple, relatively inexpensive, and relatively unsophisticated. These imaging devices may yield highly variable two-dimensional images. A machine learning model that attempts to analyze the real—but highly variable—two-dimensional images but that was trained using synthetic two-dimensional x-ray images reconstructed from high quality three-dimensional images may not prove adequate.

This is especially the case where the machine learning model is trained for purposes that are beyond the typical capacity of human practitioners. For example, machine learning models can be trained to reconstruct three-dimensional images of anatomical structures from two-dimensional images that may be highly variable. Traditionally, to train such a model, one would require a large collection of highly-variable two-dimensional images and low-variability three-dimensional images of the same anatomy—preferably collected at the same instant in time under identical conditions. The three-dimensional images proposed by the machine learning model would be compared with the "ground truth" low-variability three-dimensional images and the model and the difference would be iteratively reduced with each comparison. However, to the best of our knowledge, such a training data set does not currently exist. Further, collecting such a dataset appears to be prohibitive in time and cost.

Accordingly, systems and techniques for preparing standardized images of bones and other anatomical structures for analysis by machine learning systems are described. The machine learning models can be trained using low-variability three-dimensional images and synthetic two-dimensional x-ray images that were digitally reconstructed from the low-variability three-dimensional images. Since the synthetic two-dimensional x-ray images are generated from the low-variability three-dimensional images, they too have low variability. However, since large datasets of low-variability three-dimensional images are available, the amount of available training data is large. The standardization of the real—but more variable—two-dimensional x-ray facilitates analysis by machine learning models trained using such training data. In one aspect, a computer-implemented method includes receiving a real two-dimensional medical image of a patient, processing the real two-dimensional medical image with a computer-implemented generator configured to transfer the real two-dimensional medical image from a real image domain into a synthetic image domain, and analyzing the two-dimensional medical image transferred into the synthetic image domain with a machine-learning model. The machine-learning model was trained with a collection of synthetic two-dimensional medical images generated from real three-dimensional medical images.

This and other aspects can include one or more of the following features. The machine-learning model can be a Generative Adversarial Network. The generator can be configured to perform one or more of the following: a) align a plane of the anatomy in the real two-dimensional medical image with a standard image plane; or b) select a standardized field of view in the real two-dimensional medical image; or c) perform rigid transformation of an anatomical structure in the real two-dimensional medical image with respect to a standard image plane; or d) perform rigid transformation of an anatomical structure in a first real two-dimensional medical image with respect to an anatomical structure in a second real two-dimensional medical image. The generator can include a machine-learning model. For example, the generator can include a Generative Adversarial Network.

The method can include training the machine-learning model of the generator to transfer the real two-dimensional medical image from the real image domain into the synthetic image domain. The training of the machine-learning model of the generator can include feeding back a penalty from a discriminator that is trained to distinguish between real-looking synthetic radiographs and synthetic-looking real radiographs into the generator and adapting the machine-learning model of the generator to reduce the penalty.

The method can include inputting synthetic radiographs into a discriminator, inputting synthetic-looking real radiographs into a discriminator, and in response to the discriminator successfully discriminating between the real-looking synthetic radiographs and the synthetic-looking real radiographs, adapting the machine-learning model of the generator to reduce an ability of the discriminator to discriminate therebetween.

The method can include training the discriminator. For example, the training of the discriminator can include inputting synthetic radiographs into a discriminator, inputting synthetic-looking real radiographs into a discriminator, and in response to the discriminator failing to discriminate between the real-looking synthetic radiographs and the synthetic-looking real radiographs, adapting the discriminator to improve an ability of the discriminator to discriminate therebetween.

The real three-dimensional medical images can have been projected into two-dimensional space to generate the synthetic two-dimensional medical images using an intensity-based decomposition analysis.

In another aspect, a computer-implemented method is for configuring a generator that is implemented in a computer-implemented artificial neural network. The generator is trained to transfer real two-dimensional medical images from a real image domain into a synthetic image domain. The method includes receiving a plurality of three-dimensional medical images of different patients and a plurality of two-dimensional medical radiographs of different patients, using the generator, creating a plurality of synthetic two-dimensional radiographs based on the received plurality of three-dimensional medical images, using a computer-implemented discriminator, discriminating the synthetic two-dimensional radiographs from the synthetic-looking two-dimensional radiographs, and in response to the discriminator successfully discriminating between the real-looking synthetic radiographs and the synthetic-looking real radiographs, adapting the generator to reduce an ability of the discriminator to discriminate therebetween.

This and other aspects can include one or more of the following features. The computer-implemented artificial neural network can be a Generative Adversarial Network. Adapting the generator can include feeding back a penalty to the generator and adapting the weights of the generator to reduce the penalty. Adapting the generator can include one or more of: a) configuring the generator to align a plane of the anatomy in the real two-dimensional medical image with a standard image plane; or b) configuring the generator to select a standardized field of view in the real two-dimensional medical image; or c) configuring the generator for rigid transformation of an anatomical structure in the real two-dimensional medical image with respect to a standard image plane; or d) configuring the generator for rigid transformation of an anatomical structure in a first real two-dimensional medical image with respect to an anatomical structure in a second real two-dimensional medical image.

Creating the plurality of synthetic two-dimensional radiographs based on the received plurality of three-dimensional medical images can include projecting the real three-dimensional medical images into two-dimensional space to generate the synthetic two-dimensional medical images using an intensity-based decomposition analysis.

The method can include training the discriminator. The training of the discriminator can include inputting plane-projection-corrected radiographs into a discriminator, inputting plane-projection-uncorrected radiographs into a discriminator, and in response to the discriminator failing to discriminate between the plane-projection-corrected radiographs and the plane-projection-uncorrected radiographs, adapting the discriminator to improve an ability of the discriminator to discriminate therebetween.

Other implementations of the above-described methods of the aspects can include corresponding systems and apparatus configured to perform the actions of the methods, and computer programs that are tangibly embodied on machine-readable data storage devices and that configure data processing apparatus to perform the methods.

BRIEF DESCRIPTION OF THE DRAWINGS

For better understanding of the present application, figures representing preferred embodiments are herein attached which, however, are not intended to limit the technique disclosed herein.

FIG. 1 illustrates a set of pre-processing steps for images used for a Domain Transfer GAN training and/or other approaches for image domain transfer. The reference numbers relate to:

100—Pre-processing: Domain transfer GAN input images;
101—Inputting first 3D medical images;
102—Transforming to 2D synthetic radiographs;
103—Inputting 2D x-ray radiograph;
104—Selecting a field of view;
105—Segmenting and labeling;
106—Rigid transformations for alignment;
107—Outputting first pre-processed 2D synthetic radiographs;
108—Outputting pre-processed 2D x-ray radiograph.

Figure 2:
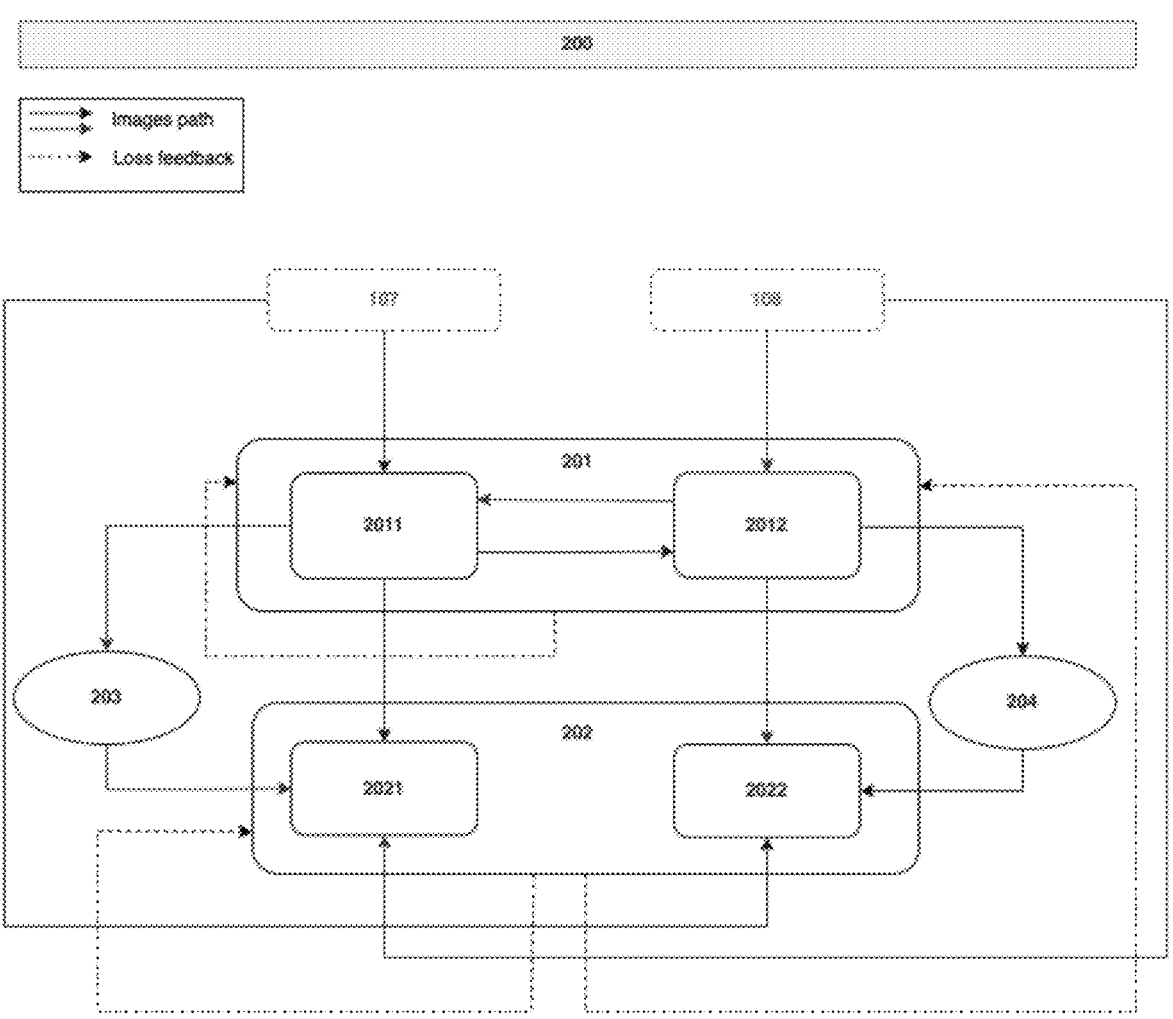

FIG. 2 illustrates a Domain Transfer Generative Adversarial Network (GAN) training model and/or classical approaches for image domain transfer. The reference numbers relate to:

200—Domain transfer GAN training;
201—Generators learn;
2011—Creating realistic-looking synthetic radiographs;
2012—Creating synthetic-looking real radiographs;
202—Discriminators learn;
2021—Is this an x-ray?
2022—Is this a synthetic radiograph?
203—Sending cycled x-ray radiographs;
204—Sending cycled synthetic radiographs.

Figure 3:
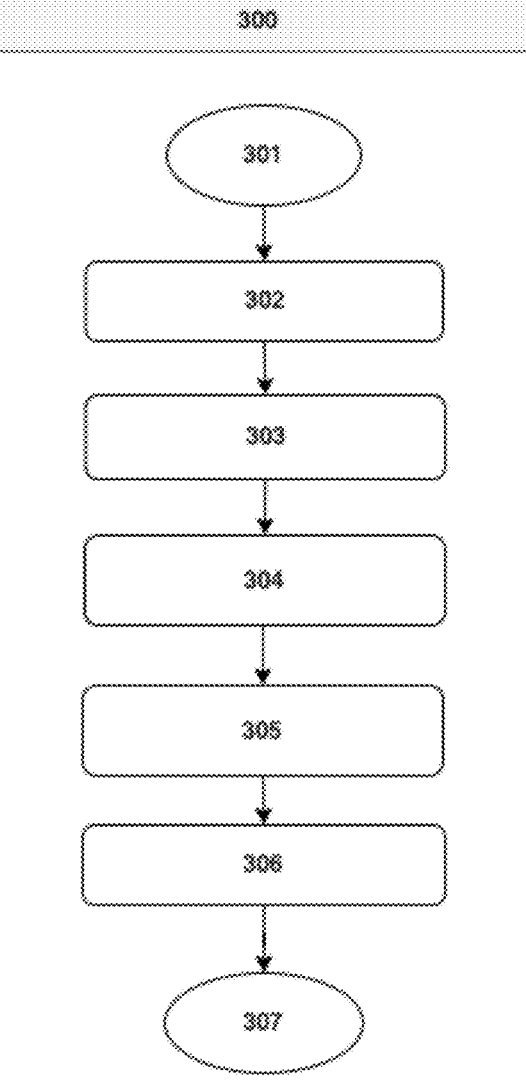

FIG. 3 illustrates a set of pre-processing steps for images used for a Plane-Projection Correction GAN training and/or classical approaches for plane-projection correction of images. The reference numbers relate to:

300—Pre-processing: Plane-Projection Correction GAN input images;
301—Inputting second 3D medical images;
302—Selecting a field of view;
303—Segmenting and labeling;
304—Rigid transformations for alignment;
305—Rigid transformations for plane-projection correction;
306—transforming to 2D synthetic radiographs;
307—Outputting second pre-processed 2D synthetic radiographs.

Figure 4:
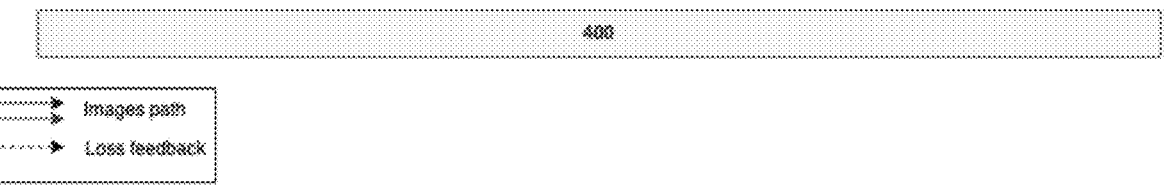
Figure 4:
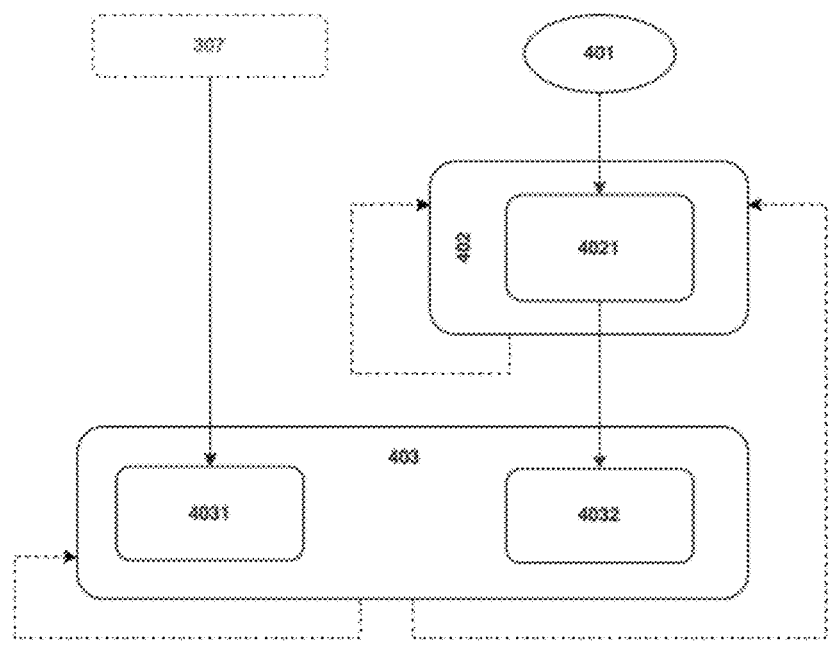

FIG. 4 illustrates a Plane-Projection Correction GAN training model and/or classical approaches for plane-projection correction of images. The reference numbers relate to:

400—Plane-Projection Correction GAN training;
401—Inputting domain-transferred images;
402—Generators learn;
4021—Producing plane-projection-corrected 2D images;
403—Discriminators learn;
4031—Are the anatomical structures correctly projected?

4032—Are the anatomical structures not correctly pro-
jected?

DETAILED DESCRIPTION OF EMBODIMENTS

With reference to the figures, some embodiments are now
described in more detail, which are however not intended to
limit the scope of the present application.

Various detailed embodiments of the present invention,
taken in conjunction with the accompanying figures, are
disclosed herein; however, it is to be understood that the
disclosed embodiments are merely illustrative. In addition,
each of the examples given in connection with the various
embodiments of the present invention is intended to be
illustrative, and not restrictive.

Throughout the specification, the following terms take the
meanings explicitly associated herein, unless the context
clearly dictates otherwise. The phrases "in one embodiment"
and "in some embodiments" as used herein do not neces-
sarily refer to the same embodiment(s), though they may.
Furthermore, the phrases "in another embodiment" and "in
some other embodiments" as used herein do not necessarily
refer to a different embodiment, although they may. Thus, as
described below, various embodiments may be readily com-
bined, without departing from the scope or spirit of the
present invention.

In addition, the term "based on" is not exclusive and
allows for being based on additional factors not described,
unless the context clearly dictates otherwise. In addition,
throughout the specification, the meaning of "a," "an," and
"the" include plural references. The meaning of "in"
includes "in" and "on."

As used herein, the terms "and" and "or" may be used
interchangeably to refer to a set of items in both the
conjunctive and disjunctive in order to encompass the full
description of combinations and alternatives of the items. By
way of example, a set of items may be listed with the
disjunctive "or", or with the conjunction "and." In either
case, the set is to be interpreted as meaning each of the items
singularly as alternatives, as well as any combination of the
listed items.

The present disclosure generally relates to the generation
of images with standardized characteristics. The generated
images can represent bone and other anatomical structures
and can be generated from two-dimensional (2D) and three-
dimensional (3D) medical images using an image domain
transfer method. By standardizing key image data charac-
teristics, subsequent processing (e.g., for pre-operative diag-
nosis and planning) using machine learning is improved.

Various image domain transfer methods may be used to
generate images with standardized characteristics from 2D
and 3D medical images. In image domain transfer, an image
is transferred from a source domain to a different, but
generally related, target domain. Image domain transfer
methods include those that rely upon trained AI models as
well as other approaches. Examples of other approaches
include non-parametric methods for texture synthesis, Mor-
phological Image Processing, Fourier Transform techniques,
Gaussian methods, among others.

The present disclosure describes standardizing images of
anatomical bony structures, such as feet, knees, hips, shoul-
ders, skulls, etc. An AI model may be trained for image
domain transfer, e.g., using deep learning or other
approaches. The image domain transfer may combine
trained AI models that use deep learning and other
approaches. In the present context, image domain transfer transfers an input image from a source x-ray radiograph
domain to an output image in a target synthetic radiograph
domain.

A model for standardizing images of anatomical struc-
tures can include a Domain Transfer Generative Adversarial
Network (GAN) and a Plane-Projection Correction GAN
that are trained accordingly. The learning process can
include one or more image generators and one or more
image discriminators for each network.

Figure 1:
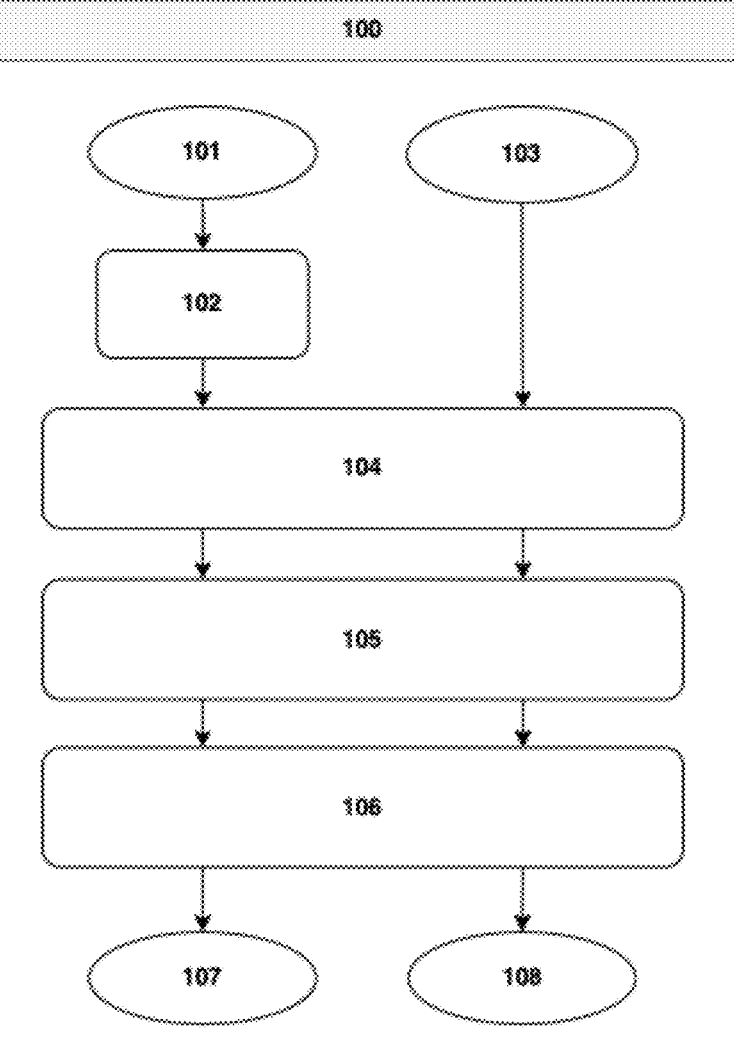

A model can be trained for image domain transfer by
pre-processing (100) the images that are to be input into a
domain transfer GAN, as represented in FIG. 1. In some
implementations, the pre-processing can be performed by a
computer or other data processing system that is remote
from the domain transfer GAN. In other implementations,
the domain transfer GAN and the pre-processing can be
implemented on the same domain transfer GAN.

Pre-processing domain transfer GAN input images (100)
can include importing 3D medical images (101) and 2D
x-ray radiographs (103) into a system, transforming the 3D
medical images to 2D synthetic radiographs (102), selection
of a field of view (104), segmentation and labeling (105),
rigid transformation for alignment of the structure of interest
(106), outputting pre-processed 2D synthetic radiographs
generated from the 3D medical images (107), and outputting
pre-processed 2D x-ray radiographs (108).

The images imported into the system may be pre-pro-
cessed to prepare the images for use in training the model for
domain transfer. The pre-processing steps may occur in the
described sequence or in another order. Also, at least some
of the pre-processing steps may occur simultaneously.

The medical images imported into the system can be in a
variety of different formats. For example, the images can be
Portable Network Graphics (*.png) images, joint photo-
graphic group (*.jpg) images, tagged image file format
(*.tiff), etc.) images, DICOM images, or the like.

The images used for pre-processing may include, but are
not limited to:

digital 2D radiographs (x-ray); and digital 3D medical images.

Digital 2D radiographs (x-ray) represent anatomical
structures of a patient in two-dimensions.

Digital 3D medical images represent anatomical struc-
tures of a patient in three-dimensions. The 3D medical
images may be conventional and/or DICOM images, and
formed, e.g., using Magnetic Resonance Imaging (MRI),
Computerized Tomography (CT), and/or Positron Emission
Tomography (PET) images.

The digital 2D radiographs and the digital 3D medical
images generally acquired from hospitals and other health-
care facilities. The 2D and 3D medical images can be stored
in a system to be used for model training.

In order to pre-process the images to train a model for
image domain transfer, digital 3D medical images are pro-
jected into a two-dimensional space to generate synthetic 2D
radiographs (102). In certain embodiments, the projection
includes an intensity-based decomposition analysis. The
intensity-based decomposition analysis divides each 3D
medical image into a plurality of sub-components based on
their voxel intensity. This means the 3D medical image is
divided into sub-components based on the value on a regular
grid in three-dimensional space. The sub-components are
recombined based on their weighted average of voxel inten-
sity and a new representation of the image is created. The
image resulting from the combination of the sub-compo-
nents may be projected into one or more planes (x, y, or z)
by averaging their values along that plane while preserving the initial intensity range. This simulates the projection of an x-ray to create a simulated x-ray image. The generated synthetic radiographs are used in conjunction with the digital radiographs to train the model for image domain transfer.

Synthetic radiographs may be digitally reconstructed radiographs (DRR). Synthetic radiographs are a simulation of radiographic images and may be produced by a perspective projection of 3D images into a 2D image. The synthetic radiographs can be stored in a system and used for model training.

Example selections of a field of view can include the selection of relevant parts of an image. In general, the extended background of real radiographs (x-ray) includes anatomical structures besides the anatomy of interest (for example, soft tissues). Real radiographs (x-ray) also include calibration markers and/or context-specific intensity distributions that impact the contrast between different constituents of the bone. Example factors that contribute to context-specific intensity distributions include patient-specific characteristics, the acquisition protocol for the medical images, and/or the type or brand of the imaging machine used to obtain the medical images.

Furthermore, real radiographs (x-ray) may also not be centered in the anatomy of interest. Selecting the field of view (104) limits the image to relevant data. For example, the synthetic radiographs can be centered in the anatomy of interest and only include the field of view necessary for an analysis or a procedure. Selecting a field of view similar to the synthetic radiographs also reduces the variability associated with real radiographs and improves the performance of subsequent processing steps. Selection of the field of view may be performed automatically or manually. Image cropping and padding ensure that the position and size of the field of view are correct and limit the image to relevant data.

The pre-processing of the images may further include segmenting and labeling of target bones in the images (105). Real radiographs and synthetic radiographs can be segmented and target bones can be labeled either manually or automatically by a device. In the present disclosure a target bone is any bone that has been determined to be of interest to an analysis or procedure. The images with labeled target bones can be stored in annotated datasets.

The pre-processing of the images may further include rigid transformation for aligning structures of interest (106). This is particularly useful in cases where the anatomical structures were not aligned during acquisition. Alignment correction standardizes the alignment of anatomical structures of interest. An example alignment correction is flexion alignment. Flexion alignment may only be applied to images that represent anatomical structures that were scanned while flexed. Many anatomical structures can be flexed such that the angle between the bones of the limb and the joint is higher than zero. Examples of structures that can be flexed are joint structures such as knees, feet, elbows, and shoulders. Rigid transformation can also correct misalignments other than flexion misalignment.

In many cases, calculation of the cycle loss in the domain transfer GAN training (200) described below benefits from alignment correction of the images of non-aligned anatomical structures. For example, the axis of the misalignment in the images can be detected and a line representing an axis with a zero angle can be established. The anatomical structures can then be aligned using a standardized reference image or axis as reference. Registration algorithms that use rigid transformations or others can be used. Registration algorithms seek to maximize the similarity of a movable image to a fixed image (i.e., to a standardized reference image) by applying spatial transformations. Spatial transformations include translations, rotations, dilations, and the like. The transformations can be calculated in an iterative process using an optimizer function. To preserve the native dimensions of the anatomical structure, only rigid transformations are applied.

Other approaches may directly determine the alignment of the structure of interest and re-align the structure to a standard position. The alignment correction generally results in images representing a standardized geometric arrangement without removing other image characteristics. The images that have aligned anatomical structures can be used to calculate the cycle loss in the domain transfer GAN training (200). The original images presenting non-aligned anatomical structures can be used as input data to train the domain transfer GAN (200).

From the pre-processing of domain transfer GAN input images may result in pre-processed 2D synthetic radiographs generated from the 3D medical images (107), and pre-processed 2D x-ray radiographs (108).

Training the model for standardizing images of anatomical structures can include Domain Transfer GAN training (200), as represented in FIG. 2. An example of the domain transfer GAN is a Cycle-Consistent Generative Adversarial Network (CycleGAN). For didactic purposes, the following description presents examples generally related to training a CycleGAN. However, various aspects of the teachings can be applied to other GANs as well.

Training a domain transfer GAN (200) can include importing the pre-processed 2D synthetic radiographs generated from the 3D images (107) and the pre-processed 2D x-ray radiographs (108) into a system, generating images in a different domain using a generator (201), differentiating images based on their domain using a discriminator (202), and using loss feedback with generator penalties, e.g., using cycle consistency loss. Various steps in the training process may occur independently or not, simultaneously or not, and in parallel to each other or not.

As presented in FIG. 2, training of the domain transfer GAN (200) may combine training of a CycleGAN, a GAN, and a deep-learning based approach. The learning process of the GAN includes training at least one image generator and at least one image discriminator. The image generator generates a new image similar to an intended target. The image discriminator differentiates the generated images to the target images. The image generator and the discriminator may be trained simultaneously and/or sequentially.

The relative change of the intensity signals (i.e., the signals representing x-ray absorption) should make the synthetic radiograph more similar to a real radiograph and the realistic radiograph more similar to the synthetic radiograph. Similarity can be judged in terms of appearance and realism in a variety of different ways. Examples are given below.

In more detail, compared to real radiographs, synthetic radiographs are generally smoother, have less anatomical detail, have fewer scanner-induced artifacts and no calibration markers. This results from the acquisition and projection processes. Making synthetic radiographs more realistic thus introduces fine details and characteristics that are typical in real computed radiography. The details and characteristics added can be, for example, the calibration marker and different gradients of intensities. In contrast, making real radiographs more synthetic-looking removes some of the images and subject-specific characteristics that are considered unnecessary. Examples of specific characteristics that can be removed include some of the finer anatomical and soft tissue details.

The pre-processed 2D x-ray radiographs and the pre-processed 2D synthetic radiographs are sent to the image generator (201). Using one generator, the synthetic radiographs are transformed into the image domain of radiographs (2011). This results in realistic-looking synthetic radiographs. Using another generator, the real radiographs are transformed into the image domain of synthetic radiographs (2012). This results in synthetic-looking real radiographs. The exact features necessary to achieve the transfer are learned by the generators and do not need to be defined manually by human action.

The synthetic-looking real radiographs and the realistic-looking synthetic radiographs output from the generators are sent to at least one discriminator (202). The discriminator(s) can be trained to distinguish real from synthetic images and vice versa. The discriminator(s) receive synthetic-looking radiographs and attempt to detect if the images are synthetic radiographs. Likewise, the discriminator(s) receive the real-istic-looking synthetic radiographs and attempt to detect if the images are real radiographs. Although the discriminator (s) are able to learn to distinguish between real and synthetic radiographs, the images and indications of the differences between the real and synthetic radiographs are sent back to the generator to update its parameters. The image domain transfer process is repeated until the discriminator(s) are incapable of learning to distinguish the synthetic and the real radiographs.

In some embodiments, the digital radiographs and the synthetic radiographs may also be sent directly to the discriminator. The discriminator is also trained to distinguish real from synthetic images and vice versa.

In some embodiments, the method further uses loss feedback to render images from the generators to be close to the target domain and to improve the training performance. The loss that is fed back is a metric that indicates the discriminator's ability to distinguish the two types of images. Every time that the discriminator is able to successfully distinguish a real image from a synthetic one, it penalizes the current version of the generator model and forces the model to improve.

The learning process of the domain transfer GAN further comprises the use of a Cycle-Consistency Loss. Cycle-Consistency Loss is introduced in the generator. In a first pass, one generator transforms the x-ray radiographs into synthetic-looking real radiographs. In a second pass, another generator transforms the synthetic-looking real radiograph back into a realistic radiograph. Likewise, a generator transforms, in a first pass, the synthetic radiographs into realistic-looking synthetic radiographs. In a second pass, a second generator cycles the realistic-looking synthetic radiograph back into a synthetic-looking synthetic radiograph. Furthermore, the Cycle-Consistency Loss considers both the transfer of the image domain and the alignment correction by comparing the cycled images to the aligned original images. The Cycle-Consistency Loss is calculated as the difference between the anatomically aligned original image and the double cycled image. The Cycle-Consistency Loss is combined, using a weighted factor, with the Discriminator loss.

For the purpose of the present disclosure, the images outputted from the domain transfer GAN will be referred to as "domain-transferred images".

The model training for standardizing images of anatomical structures further includes training a plane-projection correction GAN (400). As shown in FIG. 3, the training of the plane-projection correction GAN can include pre-processing plane-projection correction GAN input images (300). Pre-processing plane-projection correction GAN input images can include importing 3D medical images into a system (301), selecting a field of view (302), segmenting and labeling of images (303), rigid transformation for alignment correction (304), rigid transformation for visual plane-projection correction (305), transforming to second 2D synthetic radiographs (306), and outputting second pre-processed 2D synthetic radiographs generated from 3D medical images (307).

In some embodiments, the selection of the field of view in the 3D medical images (302) occurs in the same way as described previously in the training of the domain transfer GAN.

In some embodiments, the step of segmenting and labeling of the second 3D medical images (303) occurs in the same way as described previously for the training of the domain transfer GAN.

In some embodiments, the step of performing rigid transformations for alignment correction on the second 3D medical images (304) occurs in the same way as described previously for the training of the domain transfer GAN.

In some embodiments, the rigid transformations for plane-projection correction (305) are applied to the second 3D medical images where anatomical planes are not parallel to image planes. Plane-projection correction may be applied in medical images where the anatomical structures were imaged with the anatomical plane not parallel to the image plane. Images with anatomical planes not parallel to the image plane are visually rotated anatomical structures. Visually rotated anatomical structures may not be accurate representations of the anatomical structures. The use of non-accurate representations of anatomical structures may result in the use of images that do not correspond to accurate medical images. For the purpose of the plane-projection correction GAN training described below, the images that represent visually rotated anatomical structures need to be pre-processed to correct the angle of the rotation. Rigid transformations for correction of the angle of rotation entails aligning the anatomical plane in parallel with the image plane. The pre-processing includes detecting the axis of the rotation in the anatomical structures and defining an axis with a zero rotation angle. The pre-processing further includes rotation and translation to align anatomical structures having as reference the origin axis. The rotation and translation may be performed using manual or automated means. The removal of the rotation results in 3D medical images representing accurate anatomical structures without removing any other characteristics.

For the purpose of training the model for standardizing images of anatomical structures, the pre-processed second digital 3D medical images are projected into a two-dimensional space to generate second synthetic 2D radiographs (306). The transformation of 3D medical images into synthetic radiographs occurs in the same way as described previously for the training of the domain transfer GAN. The transformation outputs second synthetic radiographs, representing anatomical structures with their plane-projection corrected (307).

As shown in FIG. 4, training a plane-projection correction GAN (400) can include importing the second pre-processed 2D synthetic radiographs generated from 3D medical images (307) and the domain-transferred images (401), generating plane-projection corrected images using a generator (402), differentiating images based on their plane-projection using a discriminator (403), and using a loss feedback to update model parameters. These various steps in training of the plane-projection correction GAN may occur independently or not, simultaneously or not, and in parallel to each other or not.

The second synthetic radiographs (307) and the domain-transferred images (401) are imported into the system to train the plane-projection correction GAN. The domain-transferred images represent 2D images without the plane-projection corrected. The second synthetic radiographs represent 2D images of anatomical structures with the plane-projection corrected.

The system for training the plane-projection correction GAN includes at least one image generator and at least one image discriminator. The plane-projection correction GAN can be trained by simultaneously training the generator model to produce plane-projection-corrected 2D images and training the discriminator to distinguish between the output of the generator and the data-set of plane-projection-corrected 2D images. The loss function of the generator and consequential update of its parameters results from the feedback provided by the discriminator and its ability to identify plane-projection-corrected images. In other embodiments the discriminator can be pre-trained to distinguish between plane-projection-corrected and plane-projection-uncorrected images using a specifically curated data-set.

Training of the model for image domain transfer yields real and synthetic radiographs that are indistinguishable from each other. The pipeline can standardize key characteristics of the image data so as to improve subsequent processing in pre-operative planning systems. These images can be used to generate 3D models of anatomical structures from 2D radiographs, for example, as described in European Application No. 22398005.3, filed on Mar. 4, 2022.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, it will be understood that various modifications may be made. Accordingly, other implementations are within the scope of the following claims.

The invention claimed is:

1. A computer-implemented method, the method comprising:
   receiving a real two-dimensional medical image of a patient;
   processing the real two-dimensional medical image with a computer-implemented generator configured to transfer the real two-dimensional medical image from a real image domain into a synthetic image domain; and
   analyzing the two-dimensional medical image transferred into the synthetic image domain with a machine-learning model, wherein the machine-learning model was trained with a collection of synthetic two-dimensional medical images generated from real three-dimensional medical images; and
   training the machine-learning model of the generator to transfer the real two-dimensional medical image from the real image domain into the synthetic image domain, wherein training the machine-learning model of the generator comprises
      feeding back a penalty from a discriminator that is trained to distinguish between real-looking synthetic radiographs and synthetic-looking real radiographs into the generator, and
      adapting the machine-learning model of the generator to reduce the penalty.

2. The method of claim 1, wherein the machine-learning model is a Generative Adversarial Network.

3. The method of claim 1, wherein the generator is configured to perform one or more of the following:
   a) align a plane of the anatomy in the real two-dimensional medical image with a standard image plane; or
   b) select a standardized field of view in the real two-dimensional medical image; or c) perform rigid transformation of an anatomical structure in the real two-dimensional medical image with respect to a standard image plane; or
   d) perform rigid transformation of an anatomical structure in a first real two-dimensional medical image with respect to an anatomical structure in a second real two-dimensional medical image.

4. The method of claim 1, wherein the generator includes a machine-learning model.

5. The method of claim 4, wherein the generator includes a Generative Adversarial Network.

6. The method of claim 1, further comprising training the discriminator.

7. The method of claim 1, wherein the real three-dimensional medical images were projected into two-dimensional space to generate the synthetic two-dimensional medical images using an intensity-based decomposition analysis.

8. The method of claim 1 wherein the method further comprises:
   inputting real-looking synthetic radiographs into a discriminator;
   inputting synthetic-looking real radiographs into a discriminator; and
   in response to the discriminator successfully identifying the real-looking synthetic radiographs and the synthetic-looking real radiographs, adapting the machine-learning model of the generator to reduce an ability of the discriminator to discriminate therebetween.

9. The method of claim 6, wherein training the discriminator comprises:
   inputting real-looking synthetic radiographs and synthetic radiographs into a discriminator;
   inputting synthetic-looking real radiographs and real radiographs into a discriminator; and
   in response to the discriminators failing to discriminate between the real-looking radiographs and the synthetic-looking radiographs, adapting the discriminators to improve an ability of the discriminator to discriminate therebetween.

10. A computer-implemented method for training a generator that is implemented in a computer-implemented artificial neural network, wherein the generator is trained to transfer real two-dimensional medical images from a real image domain into a synthetic image domain, the method comprising:
   receiving a plurality of three-dimensional medical images of different patients and a plurality of two-dimensional medical radiographs of different patients;
   using the generator, creating a plurality of synthetic two-dimensional radiographs based on the received plurality of three-dimensional medical images;
   using a computer-implemented discriminator, discriminating the synthetic two-dimensional radiographs from the synthetic-looking two-dimensional radiographs; and
   in response to the discriminator successfully discriminating between the real-looking synthetic radiographs and the synthetic-looking real radiographs, adapting the generator to reduce an ability of the discriminator to discriminate therebetween, wherein adapting the generator comprises two or more of
      a) training the generator to align a plane of the anatomy in the real two-dimensional medical image with a standard image plane, or
      b) training the generator to select a standardized field of view in the real two-dimensional medical image, or c) training the generator for rigid transformation of an anatomical structure in the real two-dimensional medical image with respect to a standard image plane, or d) training the generator for rigid transformation of an anatomical structure in a first real two-dimensional medical image with respect to an anatomical structure in a second real two-dimensional medical image.

11. The method of claim 10, wherein the computer-implemented artificial neural network is a Generative Adversarial Network.

12. The method of claim 10, wherein adapting the generator comprises feeding back a penalty to the generator and adapting the weights of the generator to reduce the penalty.

13. The method of claim 10, wherein creating the plurality of synthetic two-dimensional radiographs based on the received plurality of three-dimensional medical images comprises projecting the real three-dimensional medical images into two-dimensional space to generate the synthetic two-dimensional medical images using an intensity-based decomposition analysis.

14. The method of claim 10, further comprising training the discriminator.

15. The method of claim 10, wherein:

the method further comprises processing, using the generator, the two-dimensional medical radiographs to transfer them into a synthetic image domain to generate synthetic-looking real radiograph;

the plurality of synthetic two-dimensional radiographs are a plurality of real-looking synthetic two-dimensional radiographs; and discriminating the synthetic two-dimensional radiographs from the synthetic-looking two-dimensional radiographs comprises discriminating the real-looking synthetic two-dimensional radiographs from the synthetic-looking real radiographs.

16. A computer-implemented method for training a generator that is implemented in a computer-implemented artificial neural network, wherein the generator is trained to transfer real two-dimensional medical images from a real image domain into a synthetic image domain, the method comprising:

receiving a plurality of three-dimensional medical images of different patients and a plurality of two-dimensional medical radiographs of different patients;

using the generator, creating a plurality of synthetic two-dimensional radiographs based on the received plurality of three-dimensional medical images;

training a computer-implemented discriminator, wherein training the discriminator comprises inputting plane-projection corrected radiographs into a discriminator, inputting plane-projection uncorrected radiographs into a discriminator, and in response to the discriminator failing to discriminate between the plane-projection corrected radiographs and the plane-projection uncorrected radiographs, adapting the discriminator to improve an ability of the discriminator to discriminate therebetween;

using the computer-implemented discriminator, discriminating the synthetic two-dimensional radiographs from the synthetic-looking two-dimensional radiographs; and in response to the discriminator successfully discriminating between the real-looking synthetic radiographs and the synthetic-looking real radiographs, adapting the generator to reduce an ability of the discriminator to discriminate therebetween.

17. The method of claim 16, wherein adapting the generator comprises wherein comprises one or more of a) training the generator to align a plane of the anatomy in the real two-dimensional medical image with a standard image plane, or b) training the generator to select a standardized field of view in the real two-dimensional medical image, or c) training the generator for rigid transformation of an anatomical structure in the real two-dimensional medical image with respect to a standard image plane, or d) training the generator for rigid transformation of an anatomical structure in a first real two-dimensional medical image with respect to an anatomical structure in a second real two-dimensional medical image.

18. The method of claim 16, wherein creating the plurality of synthetic two-dimensional radiographs based on the received plurality of three-dimensional medical images comprises projecting the real three-dimensional medical images into two-dimensional space to generate the synthetic two-dimensional medical images using an intensity-based decomposition analysis.

19. The method of claim 16, wherein:

the method further comprises processing, using the generator, the two-dimensional medical radiographs to transfer them into a synthetic image domain to generate synthetic-looking real radiograph;

the plurality of synthetic two-dimensional radiographs are a plurality of real-looking synthetic two-dimensional radiographs; and discriminating the synthetic two-dimensional radiographs from the synthetic-looking two-dimensional radiographs comprises discriminating the real-looking synthetic two-dimensional radiographs from the synthetic-looking real radiographs.

* * * * *